(12) United States Patent
Anders et al.

(10) Patent No.: US 9,079,678 B2
(45) Date of Patent: Jul. 14, 2015

(54) METHODS FOR PACKAGING PRODUCTS

(71) Applicant: Durable Packaging International, Inc., Wheeling, IL (US)

(72) Inventors: Scott Anders, Buffalo Grove, IL (US); Darren Anders, Deerfield, IL (US)

(73) Assignee: Durable Packaging International, Inc., Wheeling, IL (US)

( * ) Notice: Subject to any disclaimer, the term of this patent is extended or adjusted under 35 U.S.C. 154(b) by 91 days.

(21) Appl. No.: 14/050,334

(22) Filed: Oct. 9, 2013

(65) Prior Publication Data

US 2015/0096668 A1   Apr. 9, 2015

(51) Int. Cl.
  *B65B 13/02*  (2006.01)
  *B65B 49/16*  (2006.01)
  *B65B 33/02*  (2006.01)
  *B62B 13/02*  (2006.01)
  *A47J 47/00*  (2006.01)

(52) U.S. Cl.
  CPC .................. *B65B 33/02* (2013.01); *A47J 47/00* (2013.01); *B62B 13/02* (2013.01); *B65B 49/16* (2013.01); *Y10T 156/1034* (2013.01)

(58) Field of Classification Search
  None
  See application file for complete search history.

(56) References Cited

U.S. PATENT DOCUMENTS

2007/0007293 A1* 1/2007 Sambrailo et al. ......... 220/366.1

* cited by examiner

*Primary Examiner* — Barbara J Musser
(74) *Attorney, Agent, or Firm* — Richards Patent Law P.C.

(57) ABSTRACT

The present disclosure provides methods for packaging products by applying a first portion of an adhesive strip to an outer surface of a packaging product. The packaging product includes a plurality of stack containers forming a rim, an outer surface, and an inner surface. The second portion of the adhesive strip is bent over the rim by applying pressurized air to the adhesive strip. In addition, the method includes applying force to the second portion of the adhesive strip to releasably attach the second portion of the adhesive strip to the inner surface of the packaging product.

16 Claims, 7 Drawing Sheets

METHODS FOR PACKAGING PRODUCTS

BACKGROUND OF THE INVENTION

The present subject matter relates generally to methods of packaging products, specifically, containers.

Many containers, such as disposable food storage containers and reusable bakeware, are sold in product packages containing two or more containers stacked on each other or nested partially within each other.

The containers are held together by a variety of methods. For example, the containers may be held together by thin cardboard paper folded around the containers, wherein the cardboard is adhered to itself, essentially forming a box-like structure around the containers. The cardboard typically has product marketing displayed on the outer surface, as well as the bar code used for purchase. However, the use of cardboard is not environmentally friendly and requires a high labor cost of assembly.

The most used method of securing containers together involves shrink-wrapping the containers together with a specific type of plastic that, upon heating, is capable of shrinking to form a plastic seal around an article. Typically, in an assembly line operation, a person will loosely put a plastic sleeve around the article, the article with the plastic sleeve will proceed to a high temperature zone, where the plastic shrinks around the article, and maintains the shrunk shape at room temperature. However, the shink-wrap, when exposed to increased temperatures, such as during shipping in the summer months, may change shape and fail to hold containers together. In addition, this process not only requires human labor of placing plastic sleeves around each package product, but also requires a higher energy cost owing to the increase in temperature required to reshape the plastic, as well as being environmentally unfriendly.

Accordingly there is a need for a packaging method that is cost effective, reduces manual labor, environmentally friendly, and more efficient than conventional methods.

BRIEF SUMMARY OF THE INVENTION

The present disclosure provides methods for packaging products. Various examples of the methods are provided herein.

The present disclosure provides an energy and cost efficient method of packaging products. Specifically, the disclosure provides a method to secure stacked or nested containers together for shipping or commerce by applying a portion of an adhesive strip to an outer surface of the stacked containers. Pressurized air may then be used to bend a portion of the adhesive strip not attached to the packaging product, over the rim of the containers. Lastly, the portion of the adhesive strip not attached to the packaging product is then adhered to the inner surface of the packaging product. The method steps may be performed as part of an assembly line for packaging containers together.

In an embodiment, the method for packaging products includes applying a first portion of an adhesive strip to an outer surface of a packaging product, wherein the packaging product includes a plurality of stacked containers, the plurality of stacked containers forming a rim, the outer surface, and an inner surface. In one example, the method may include applying at least two adhesive strips to the outer surface of the packaging product.

The method further includes bending a second portion of the adhesive strip over the rim towards the inner surface by applying pressurized air to the adhesive strip. In addition, the method includes applying a force to the second portion of the adhesive strip to releasably attach the second portion of the adhesive strip to the inner surface.

In an example, when the adhesive strip is applied to the outer surface of the packaging product, the adhesive strip includes a front face and a back face, wherein the front face includes an adhesive portion and a non-adhesive portion and the back face is non-adhesive. The adhesive strip may be folded along an edge to form a tab that embodies the non-adhesive portion of the front face.

The adhesive strip may further include a midline dividing the adhesive strip into two halves, wherein the midline is aligned with the rim after the force is applied to the second portion of the adhesive strip to releasably attach the second portion of the adhesive strip to the inner surface.

In an example, the step of bending the second portion of the adhesive strip over the rim towards the inner surface by applying pressurized air to the adhesive strip may include bending the adhesive strip to be approximately perpendicular to the inner surface of the packaging product. The step of applying a force to the second portion of the adhesive strip to releasably attach the second portion of the adhesive strip to the inner surface may include physically contacting a non-adhesive section of the adhesive strip.

In another example, the plurality of stacked containers may include at least two baking pans. Alternatively, or in addition to, the plurality of stacked containers may include at least two food storage containers.

Further, the packaging product may include four side panels, each having an inner surface and an outer surface. Alternatively, the packaging product may include a side panel forming a cylinder having an inner surface and an outer surface.

In one example, the adhesive strip has a width between, and including, 1 cm and 10 cm, and wherein the adhesive strip has a length between, and including, 5 cm and 20 cm. The adhesive strip may include a polyester lining and an acrylic-based adhesive.

In an embodiment, the method for packaging products includes applying a first portion of an adhesive strip to an outer surface of a packaging product, wherein the packaging product includes a plurality of stacked containers, the plurality of stacked containers forming a rim and the outer surface, wherein the rim includes a rim top surface.

The method further includes bending a second portion of the adhesive strip over the rim top surface by applying pressurized air to the adhesive strip. In addition, the method includes applying a force to the second portion of the adhesive strip to releasably attach the second portion of the adhesive strip to the rim top surface.

In another embodiment, the method includes providing a packaging product including a plurality of stacked containers, the plurality of stacked containers forming a stacked plurality of rim beads forming an outer plane. The method further includes applying a first portion 16 of an adhesive strip to the outer plane, wherein the adhesive strip spans the plurality of rim beads, and applying a force to the second portion of the adhesive strip to releasably attach the second portion of the adhesive strip to the outer plane.

The adhesive strip may include a front face and a back face, wherein the front face includes an adhesive portion and a non-adhesive portion and the back face is non-adhesive, wherein the front face adheres to the outer plane.

An advantage of the present methods is decreasing the labor requirements and costs associated with packaging products.

A further advantage of the present method is providing a packaging method that uses fewer packaging materials, thus being environmentally friendly.

Another advantage of the present method is that it allows marketing materials to be printed on the adhesive strip.

A further advantage of the present methods is that the packaging method is energy efficient because it does not require a change in temperature to secure the containers together, as is necessary with shrink-wrap methods.

Another advantage of the present method is that the method and resulting packaged product is not susceptible to weathering due to varying temperatures, such as during shipping or transportation.

Yet another advantage of the present methods is providing a packaging method that results in a packaged product that is easy to remove from the packaging.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
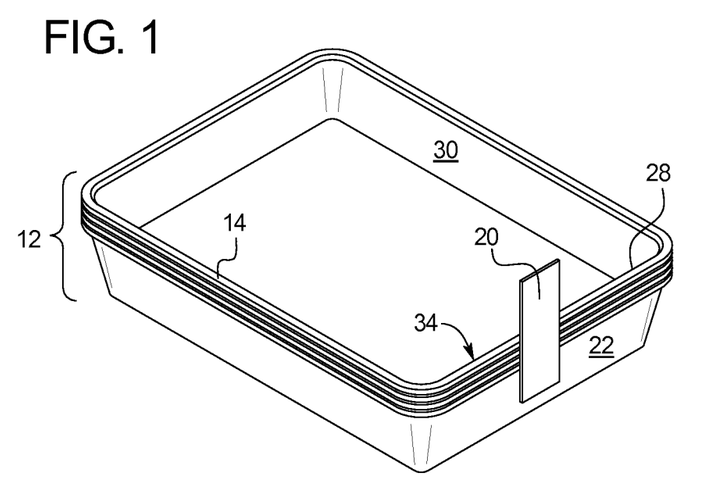
FIG. 1 is a perspective view of an embodiment of a first portion of an adhesive strip applied to the outer surface of the packaging product.

The present disclosure provides methods 10 for packaging products 12, namely, containers 14. In an embodiment, the method 10 includes applying a first portion 16 of an adhesive strip 20 to an outer surface 22 of a packaging product 12, wherein the packaging product 12 includes a plurality of stacked containers 14, as shown in FIG. 1. In one example, the method 10 may include applying at least two adhesive strips 20 to the outer surface 22 of the packaging product 12.

The stacked containers 14 comprising the packaging product 12 may be any suitable containers that are typically packaged and sold together. For example, the plurality of stacked containers 14 may include at least two baking pans, such as disposable pie pans or casserole pans. Alternatively, or in addition to, the plurality of stacked containers 14 may include at least two food storage containers, such as, disposable, plastic food containers. The term "stacked" may indicate, but is not limited to, items that partially fit inside one another. For example, containers that are nested inside one another, as well as containers that rest on top of each other but not necessarily nested within each other, are all included within the term "stacked."

Figure 2:
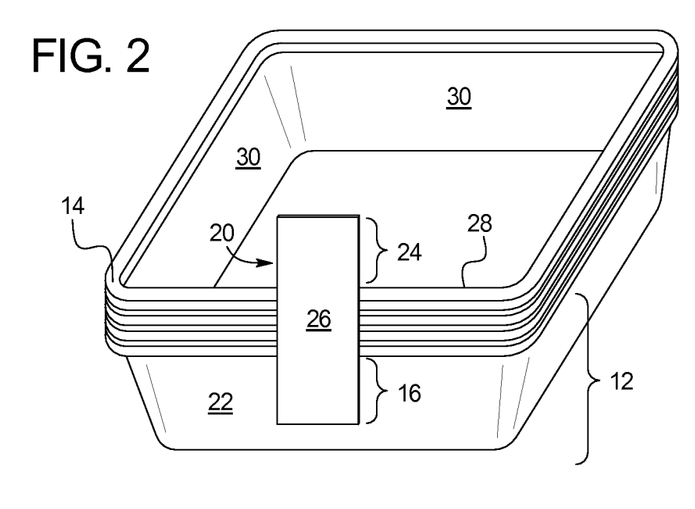
FIG. 2 is a perspective view of an example of an embodiment of a first portion of an adhesive strip applied to the outer surface of the packaging product.

As shown in FIG. 2, the adhesive strip 20 includes a first portion 16 and a second portion 24. In one example, a midline 34 may virtually divide the adhesive strip 20 into the first portion 16 and the second portion 24. The adhesive strip further includes a front face 18 and a back face 26. In one example, the front face 18 may include an adhesive portion and the back face 26 may be non-adhesive. In another example, the front face 18 may include an adhesive portion and a non-adhesive portion. The incorporation of a non-adhesive portion into the front face 18 that also includes an adhesive portion, allows a user to easily remove the adhesive strip 20 from the packaging product 12.

The adhesive strip 20 may include any suitable material that is rigid enough to maintain a planar structure without the application of force, while at the same time flexible enough to bend over the rim 28 with the application of force, such as the force from pressurized air. For example, the adhesive strip 20 may include a polyester lining. The adhesive used in the adhesive strip 20 may be any suitable adhesive, such that when the adhesive strip 20 is removed from the packaging product 12 that the adhesive does not leave any residue on the packaging product 12. For example, the adhesive may include an acrylic-based adhesive.

As shown in FIGS. 1-2, the plurality of stacked containers 14 form a rim 28, the outer surface 22, and an inner surface 30. In other words, the packaging product 12 includes a rim 28, an outer surface 22, and an inner surface 30. The present disclosure provides a method 10 of connecting the stacked containers 14 together by adhering the adhesive strip 20 to both the inner surface 30 and the outer surface 22 of the packaging product 12.

Figures 3A, 3B, 3C:
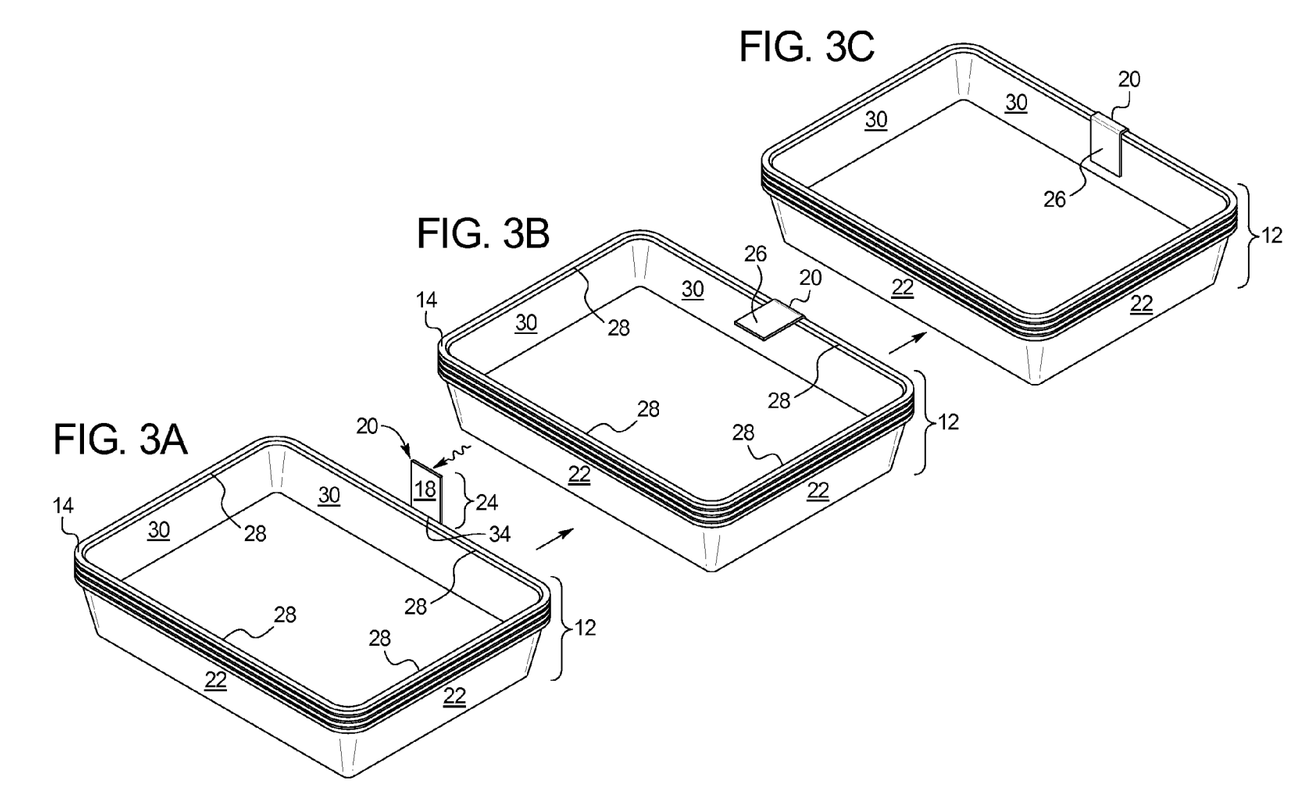
FIG. 3A is a perspective view of an example of an embodiment of a first portion of an adhesive strip applied to the outer surface of the packaging product.
FIG. 3B is a perspective view of an embodiment of an application of pressurized air to the second portion of the adhesive strip.
FIG. 3C is a perspective view of an embodiment of a first portion of an adhesive strip applied to the inner surface of the packaging product.

The method 10 further includes bending the second portion 24 of the adhesive strip 20 over the rim 28 towards the inner surface 30 by applying a force perpendicular to the second portion 24 of the adhesive strip 20. For example, the force may be pressurized air directed to a non-adhesive side of the adhesive strip 20. As shown in FIG. 3A, the pressurized air may be directed to the second portion 24 of the back face 26 of the adhesive strip 20, forcing the second portion 24 to bend over the rim 28, towards the inner surface 30 of the packaging product 12, as shown in FIG. 3B. In an example, the step of bending the second portion 24 of the adhesive strip 20 over the rim 28 towards the inner surface 30 by applying pressurized air to the adhesive strip 20 may include bending the adhesive strip 20 to be approximately perpendicular to the inner surface 30 of the packaging product 12, as shown in FIG. 3B. The pressurized air may be from any suitable source, such as a compressed air source.

In addition, the method 10 includes applying a force to the second portion 24 of the adhesive strip 20 to releasably attach the second portion 24 of the adhesive strip 20 to the inner surface 30, as shown in FIG. 3C. The force may be generally perpendicular to the second portion 24 of the adhesive strip 20 such that second portion 24 is adhered to the inner surface 30 of the packaging product 12.

The step of applying a force to the second portion 24 of the adhesive strip 20 to releasably attach the second portion 24 of the adhesive strip 20 to the inner surface 30 may include physically contacting a non-adhesive section of the back face 26 of the adhesive strip 20. For example, the force may be pressurized air, or, preferably, the force may be physical contact from a mechanical body that moves the second portion 24 towards the inner surface 30. The force may be applied by a roller as part of an assembly line process, wherein the roller contacts the second portion 24 and rolls down the second portion 24 along the inner surface 30, thereby adhering the second portion 24 to the inner surface 30.

Figure 7A:
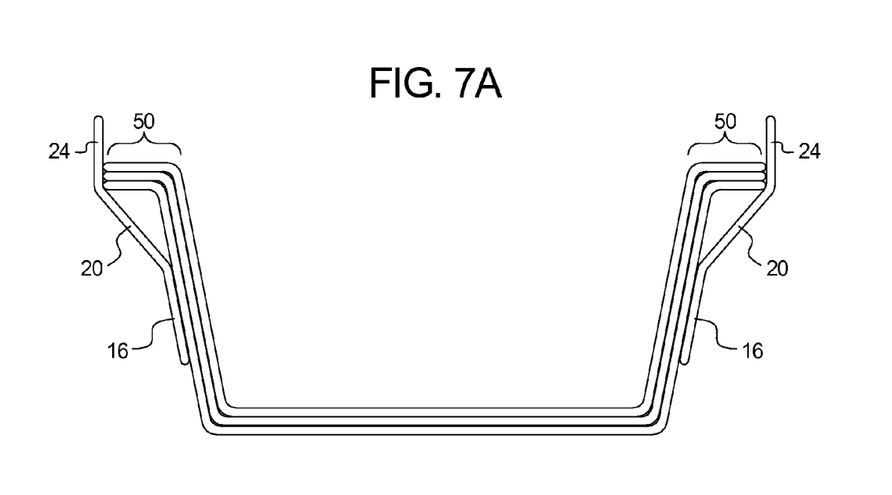
FIG. 7A is a cross-sectional side view of an embodiment of the method wherein the first portion of the adhesive strip adheres to the outer surface of the packaging product.
Figure 7B:
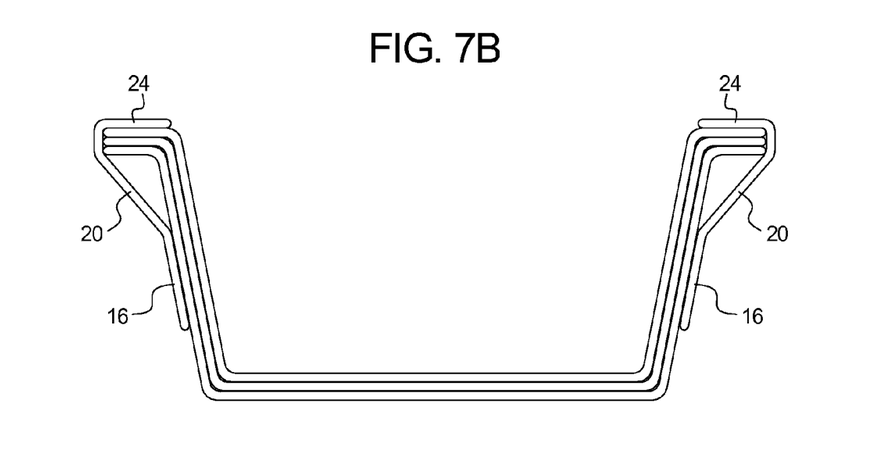
FIG. 7B is a cross-sectional side view of an embodiment of the method wherein the second portion of the adhesive strip adheres to the rim top surface.

As shown in FIGS. 7A-7B, the present disclosure also provides a method 10 for packaging containers that includes applying a first portion 16 of an adhesive strip 20 to an outer surface 22 of a packaging product 12, wherein the packaging product 12 includes a plurality of stacked containers 14, the plurality of stacked containers 14 forming a rim 28 and the outer surface 22, wherein the rim 28 includes a rim top surface 50. The method further includes bending a second portion 24 of the adhesive strip 20 over the rim top surface 50 by applying pressurized air to the adhesive strip 20. In addition, the method 10 includes applying a force to the second portion 24 of the adhesive strip 20 to releasably attach the second portion 24 of the adhesive strip 20 to the rim top surface, as shown in FIG. 7B. In other words, the method 10 may include releasably attaching the second portion 24 of the adhesive strip 20 to the rim top surface alone. Alternatively, or in addition to, the method 10 may include releasably attaching the second portion 24 to the inner surface 30 of the packaging product 12.

Figure 8A:
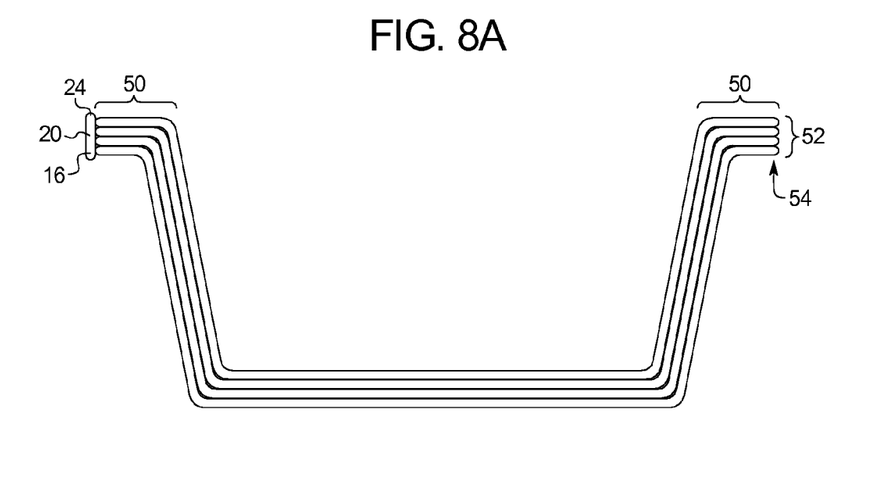
FIG. 8A is a cross-sectional side view of an embodiment of the method wherein the adhesive strip adheres to the outer plane of the rim beads.
Figure 8B:
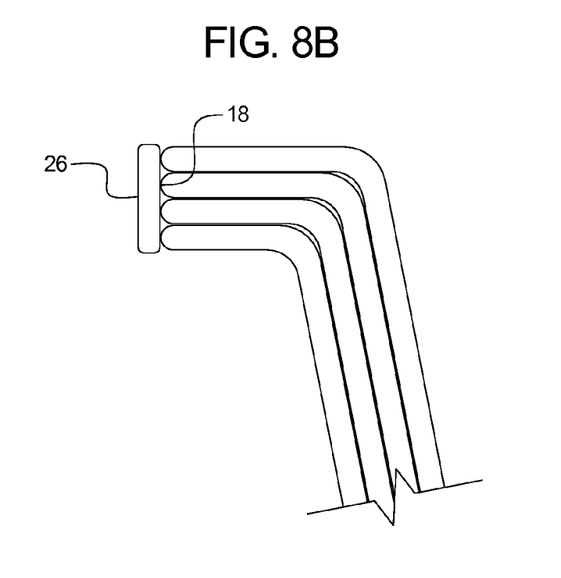
FIG. 8B is close up of a portion of the embodiment shown in FIG. 8A.

In another embodiment, as shown in FIG. 8A, the method 10 includes providing a packaging product 12 including a plurality of stacked containers 14, the plurality of stacked containers 14 forming a stacked plurality of rim beads 52 forming an outer plane 54. The method 10 further includes applying a first portion 16 of an adhesive strip 20 to the outer plane 54, wherein the adhesive strip 20 spans the plurality of rim beads 52, and applying a force to the second portion 24 of the adhesive strip 20 to releasably attach the second portion 24 of the adhesive strip to the outer plane 54. The example shown in FIGS. 8A-8B only includes the adhesive strip 20 releasably attached to the outer plane 54 of the rim beads 52. In other words, in an example the adhesive strip 20 is not releasably attached to the outer surface 22 of the packaging container 12.

Figure 4A:
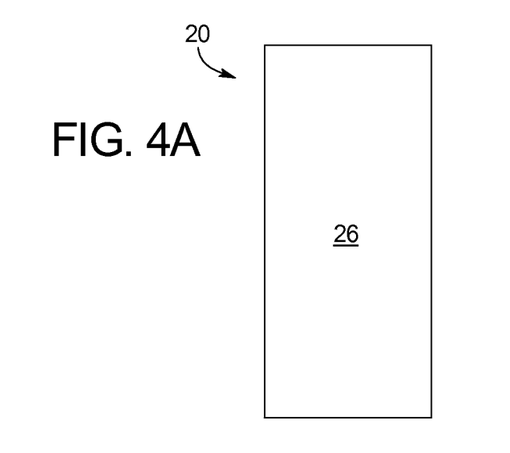
FIG. 4A is a front view of an embodiment of a back face of the adhesive strip.
Figure 4B:
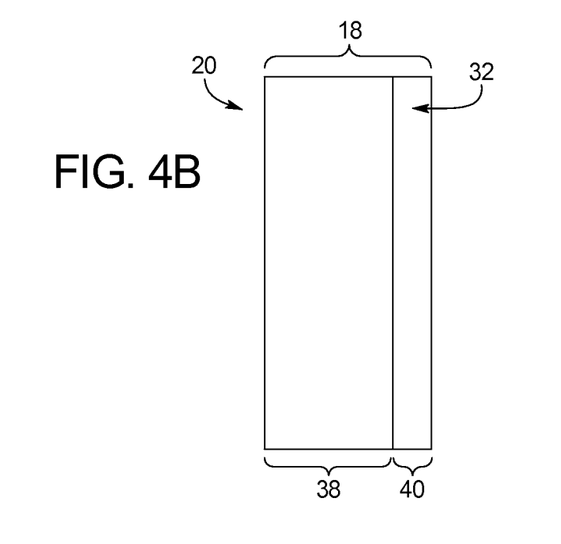
FIG. 4B is a front view of an embodiment of a front face of the adhesive strip.
Figures 5A, 5B:
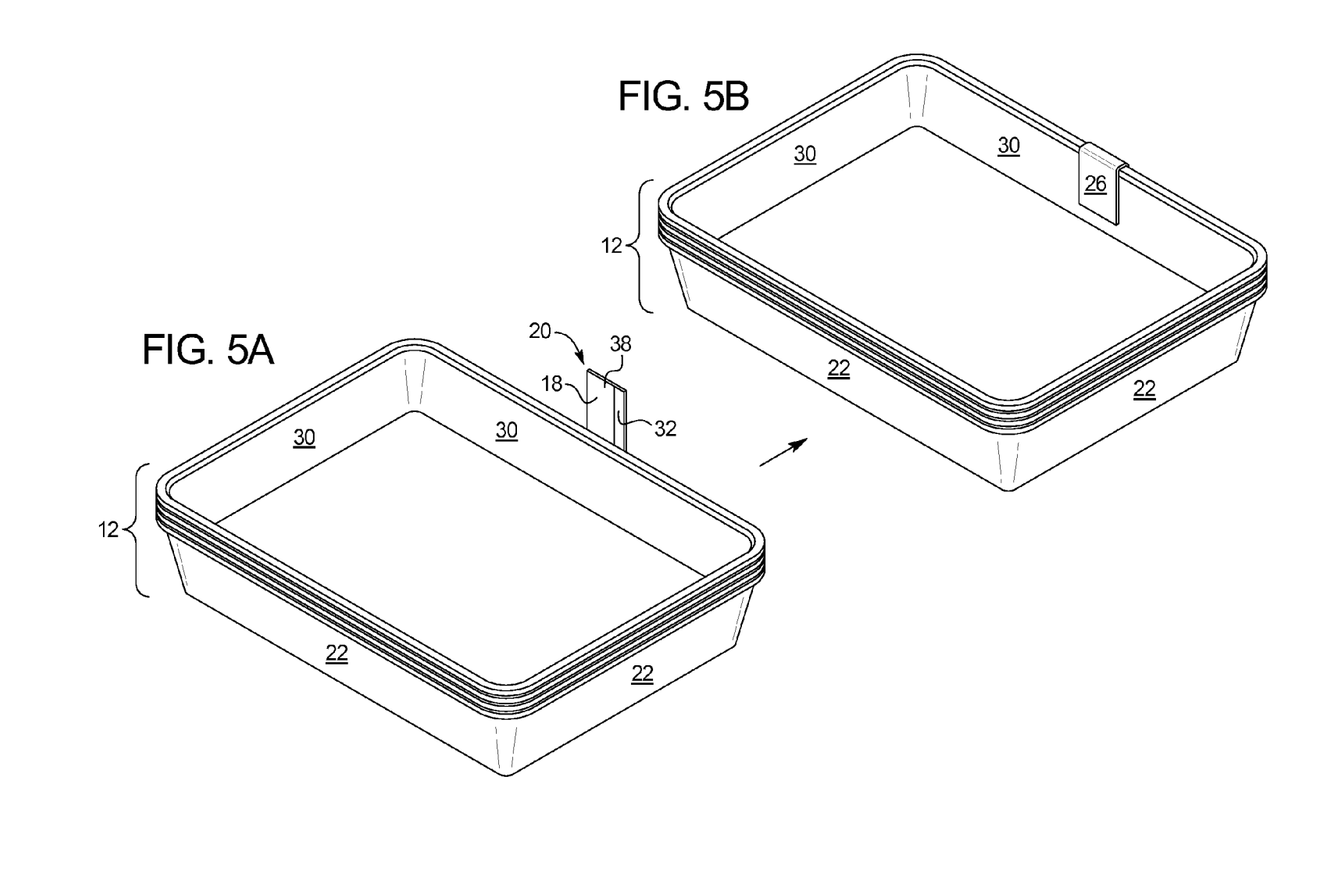
FIG. 5A is a perspective view of an embodiment of a first portion of an adhesive strip applied to the outer surface of the packaging product, wherein the adhesive strip includes a tab.
FIG. 5B is a perspective view of an embodiment of a second portion of an adhesive strip applied to the inner surface of the packaging product.

In an example, when the adhesive strip 20 is applied to the outer surface 22 of the packaging product 12, the adhesive strip 20 includes a front face 18 and a back face 26, wherein the front face 18 includes an adhesive portion 38 and a non-adhesive portion 40 and the back face 26 is non-adhesive. The adhesive strip 20 may be folded along an edge to form a tab 32 that embodies the non-adhesive portion 40 of the front face 18. For example, FIG. 4A depicts a back face 26 that is non-adhesive and FIG. 4B depicts a front face 18 including an adhesive portion 38 and a non-adhesive portion 40, wherein the tab 32 includes the non-adhesive portion 40. Further, FIG. 5A depicts the adhesive strip 20 attached to the outer surface 22 of the packaging product 12, wherein the front face 18 of the second portion 24 includes an adhesive portion 38 and non-adhesive portion 32. FIG. 5B depicts the back face 26, which is non-adhesive, of the adhesive strip 20 that is adhered to the inner surface 30 of the packaging product 12. Alternatively, as shown in the example in FIG. 8B, the adhesive strip 20 may include a front face 18 and a back face 26, wherein the front face 18 includes an adhesive portion and a non-adhesive portion and the back face is non-adhesive, wherein the front face 18 adheres to the outer plane 54.

Although the examples shown in the figures include a tab 32 that is parallel to a side edge of the adhesive strip 20, the tab may be formed in any suitable manner. For example, the tab 32 may be formed by folding a corner of the adhesive strip 20 such that the front face 18 includes an adhesive portion 38 and a non-adhesive portion 40.

The adhesive strip 20 may further include a midline 34 dividing the adhesive strip 20 into two halves. As shown in FIGS. 1 and 3A, the midline 34 is approximately aligned with the rim 28 after the force is applied to the second portion 24 of the adhesive strip 20 to releasably attach the second portion 24 of the adhesive strip 20 to the inner surface 30. In other words, the midline 34 is a virtual line that divides the adhesive strip 20 into two portions, namely, the first portion 16 and second portion 24.

The packaging product 12 may be any suitable shape. For example, the packaging product 12 may include side panels, each having an inner surface 30 and an outer surface 22. In one example, the packaging product 12 may include four side panels. Alternatively, the packaging product 12 may include a side panel forming a cylinder having an inner surface 30 and an outer surface 22.

In one example, the adhesive strip 20 has a width between, and including, 1 cm and 10 cm, and wherein the adhesive strip 20 has a length between, and including, 5 cm and 20 cm. Preferably, the adhesive strip 20 has a width between, and including, 2 cm and 5 cm, and wherein the adhesive strip 20 has a length between, and including, 5 cm and 10 cm.

Figure 6:
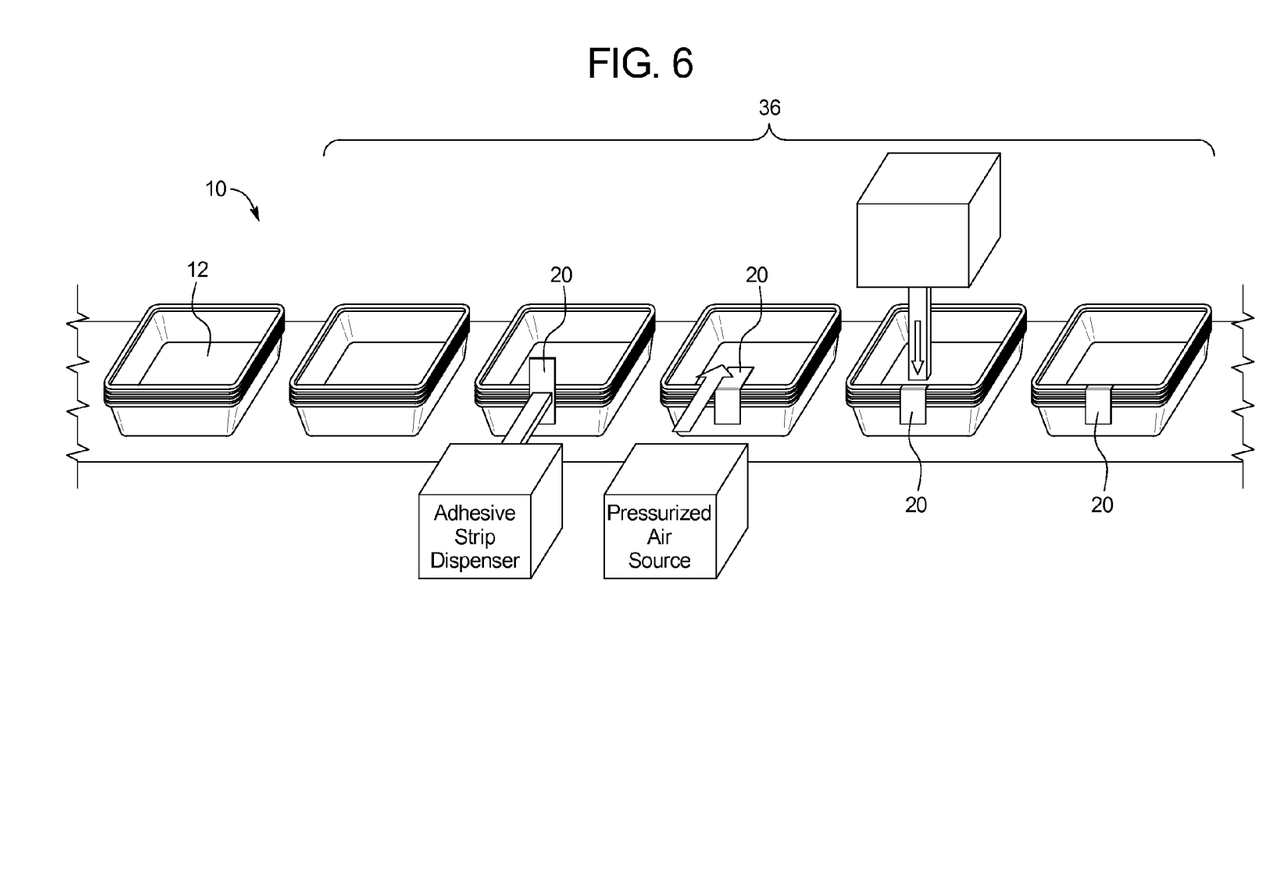
FIG. 6 is an embodiment of the method including a packaging assembly line.

FIG. 6 is a schematic of an embodiment of the method 10 carried out as part of a packaging assembly line 36. As shown in FIG. 6, an adhesive strip dispenser releases the adhesive strip 20, the first portion 16 of which is applied to the outer surface 22 of the packaging product 12. A pressurized air source is then applied to the second portion 24 of the adhesive strip 20, causing the second portion 24 to bend over the rim 28 of the packaging product 12. Then the second portion 24 of the adhesive strip 20 is releasably attached to the inner surface 30 of the packaging product 12.

In addition, the adhesive strip 20 may be dispensed in a manner that creates the tab 32 before the first portion 16 of the adhesive strip 20 is applied to the outer surface 22 of the packaging product 12. For example, the adhesive strip 20 may be dispensed through an opening having a width that is narrower than the original width of the adhesive strip 20. As the adhesive strip 20 moves through the narrow opening, an edge of the adhesive strip may fold back on itself to create tab 32. As mentioned above, the tab 32 allows a user to easily remove the adhesive strip 20 from the packaging product 12 in order to access the at least one stacked containers 14.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and portable electronic device may be provided based on various combinations of the features and functions from the subject matter provided herein.

We claim:

1. A method for packaging products, the method comprising:
    applying a first portion of an adhesive strip to an outer surface of a packaging product, wherein the packaging product includes a plurality of stacked containers, the plurality of stacked containers forming a rim, an outer surface, and an inner surface;
    bending a second portion of the adhesive strip over the rim towards the inner surface by applying pressurized air to the adhesive strip; and
    applying a force to the second portion of the adhesive tape strip to releasably attach the second portion of the adhesive strip to the inner surface.

2. The method of claim 1 wherein, when applied to the outer surface of the packaging product, the adhesive strip includes a front face and a back face, wherein the front face includes an adhesive portion and a non-adhesive portion and the back face is non-adhesive.

3. The method of claim 2 wherein the adhesive strip including a front face and a back face, wherein the front face includes an adhesive portion and a non-adhesive portion and the back face is non-adhesive is formed by folding the adhesive strip to bring two adhesive portions into contact with each other.

4. The method of claim 3 wherein the adhesive strip is folded along an edge to form a tab that embodies the non-adhesive portion of the front face.

5. The method of claim 1 wherein the adhesive strip includes a midline dividing the adhesive strip into two halves, wherein the midline is aligned with the rim after the force is applied to the second portion of the adhesive strip to releasably attach the second portion of the adhesive strip to the inner surface.

6. The method of claim 1 wherein at least two adhesive strips are applied to the outer surface of the packaging product.

7. The method of claim 1 wherein the step of bending the second portion of the adhesive strip over the rim towards the inner surface by applying pressurized air to the adhesive strip includes bending the adhesive strip to be approximately perpendicular to the inner surface of the packaging product.

8. The method of claim 1 wherein the step of applying a force to the second portion of the adhesive strip to releasably attach the second portion of the adhesive strip to the inner surface includes physically contacting a non-adhesive section of the adhesive strip.

9. The method of claim 1 wherein the plurality of stacked containers includes at least two baking pans.

10. The method of claim 1 wherein the plurality of stacked containers include at least two food storage containers.

11. The method of claim 1 wherein the plurality of stacked containers includes four side panels, each having an inner surface and an outer surface.

12. The method of claim 1 wherein the plurality of stacked containers includes a side panel forming a cylinder having an inner surface and an outer surface.

13. The method of claim 1 wherein the adhesive strip has a width between, and including, 1 cm and 10 cm, and wherein the adhesive strip as a length between, and including, 5 cm and 20 cm.

14. The method of claim 1 wherein the adhesive strip comprises a polyester liner and acrylic-based adhesive.

15. A method for packaging products, the method comprising:
    applying a first portion of an adhesive strip to an outer surface of a packaging product, wherein the packaging product includes a plurality of stacked containers, the plurality of stacked containers forming a rim and an outer surface, wherein the rim includes a rim top surface;
    bending a second portion of the adhesive strip over the rim top surface by applying pressurized air to the adhesive strip; and
    applying a force to the second portion of the adhesive tape strip to releasably attach the second portion of the adhesive strip to the rim top surface.

16. The method of claim 15 wherein, when applied to the outer surface of the packaging product, the adhesive strip includes a front face and a back face, wherein the front face includes an adhesive portion and a non-adhesive portion and the back face is non-adhesive.

* * * * *